(12) United States Patent
Burnett et al.

(10) Patent No.: US 10,262,115 B2
(45) Date of Patent: Apr. 16, 2019

(54) SECURE CONNECTED DIGITAL MEDIA PLATFORM

(71) Applicant: International Business Machines Corporation, Armonk, NY (US)

(72) Inventors: Stephen S. Burnett, Yorktown Heights, NY (US); Martin G Kienzle, Yorktown Heights, NY (US); Paul J. Ledak, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/709,723

(22) Filed: Sep. 20, 2017

(65) Prior Publication Data

US 2018/0011991 A1 Jan. 11, 2018

Related U.S. Application Data

(62) Division of application No. 15/180,804, filed on Jun. 13, 2016, now Pat. No. 9,792,418, which is a division
(Continued)

(51) Int. Cl.
*G06F 21/10* (2013.01)
*H04N 21/4408* (2011.01)
(Continued)

(52) U.S. Cl.
CPC ............. *G06F 21/10* (2013.01); *G06F 21/44* (2013.01); *H04N 21/4334* (2013.01);
(Continued)

(58) Field of Classification Search
CPC ..... G06F 21/10; G06F 21/44; H04N 21/4408; H04N 21/63345; H04N 21/818; H04N 21/4334; H04N 21/8173; H04N 21/8193
See application file for complete search history.

(56) References Cited

U.S. PATENT DOCUMENTS 6,741,841 B1 5/2004 Mitchell
7,089,425 B2 8/2006 Chan
(Continued)

FOREIGN PATENT DOCUMENTS

WO 2008085205 A2 7/2008

OTHER PUBLICATIONS

Chernock et al., "Inside iTV—Interactive Commerce Services for Broadcast Digital Television", 2002.
(Continued)

*Primary Examiner* — Mohammed Waliullah
(74) *Attorney, Agent, or Firm* — Cahn & Samuels, LLP

(57) ABSTRACT

An embodiment of the invention provides a method including accessing a portal pursuant to instructions from a digital media device and identifying the digital media device to the portal to enable the portal to obtain a security code. Information having the security code is received; and, it is confirmed that the security code corresponds to a security key stored in the digital media device. The information is provided to a secure application environment in the digital media device if the security code corresponds to the security key. A copy of the security key is sent to a clearinghouse; and, the security code is received from the clearinghouse. The security code is sent to a provider of the information if the information satisfies a predetermined criteria.

14 Claims, 9 Drawing Sheets

Related U.S. Application Data of application No. 14/064,609, filed on Oct. 28, 2013, now abandoned, which is a division of application No. 12/694,934, filed on Jan. 27, 2010, now Pat. No. 8,601,284.

(51) Int. Cl.
*H04N 21/81* (2011.01)
*H04N 21/433* (2011.01)
*H04N 21/6334* (2011.01)
*G06F 21/44* (2013.01)

(52) U.S. Cl.
CPC ... *H04N 21/4408* (2013.01); *H04N 21/63345* (2013.01); *H04N 21/818* (2013.01); *H04N 21/8173* (2013.01); *H04N 21/8193* (2013.01)

(56) References Cited

U.S. PATENT DOCUMENTS

| | | | |
|---|---|---|---|
| 7,254,836 | B2 | 8/2007 | Alkove et al. |
| 7,409,719 | B2 | 8/2008 | Armstrong et al. |
| 7,493,409 | B2 | 2/2009 | Craddock et al. |
| 8,898,746 | B2 * | 11/2014 | Gregg ..................... H04L 63/10 726/29 |
| 2003/0191814 | A1 | 10/2003 | Tran |
| 2004/0101141 | A1 | 5/2004 | Alve |
| 2004/0177369 | A1 | 9/2004 | Akins, III |
| 2004/0250066 | A1 | 12/2004 | Di Luoffo et al. |
| 2005/0193101 | A1 | 9/2005 | Oliver et al. |
| 2005/0204391 | A1 | 9/2005 | Hunleth et al. |
| 2006/0070066 | A1 | 3/2006 | Grobman |
| 2006/0095792 | A1 * | 5/2006 | Hurtado ................. G06F 21/10 713/189 |
| 2007/0124201 | A1 * | 5/2007 | Hu ........................ G06F 21/10 705/14.2 |
| 2007/0226795 | A1 | 9/2007 | Conti et al. |
| 2008/0083010 | A1 * | 4/2008 | Koehler ................ H04L 63/102 726/1 |
| 2008/0127309 | A1 | 5/2008 | Challener et al. |
| 2008/0148383 | A1 | 6/2008 | Pitchaikani et al. |
| 2008/0195664 | A1 | 8/2008 | Maharajh et al. |
| 2009/0007104 | A1 | 1/2009 | Zimmer et al. |
| 2009/0144202 | A1 | 6/2009 | Hurry |
| 2009/0193451 | A1 | 7/2009 | O'Neil |
| 2010/0004984 | A1 | 1/2010 | Beyabani |
| 2010/0169667 | A1 | 7/2010 | Dewan |
| 2010/0189265 | A1 | 7/2010 | Ito et al. |
| 2010/0241855 | A1 | 9/2010 | Chou et al. |
| 2011/0029438 | A1 | 2/2011 | Wong et al. |
| 2011/0067049 | A1 * | 3/2011 | Piepenbrink ..... H04N 21/25875 725/30 |

OTHER PUBLICATIONS

Pavlovski et al., "Digital Media Entertainment Service Delivery Platform", IBM Global Services, 2005, pp. 47-55.
Sathyan et al., "Improved Key Management Methodology for Enhanced Media Security in IMS Networks", Infosys Technologies Limited, Feb. 2007, pp. 903-907.
Office Action in U.S. Appl. No. 12/694,934; dated Oct. 24, 2012; pp. 1-7.
Office Action in U.S. Appl. No. 12/694,934; dated Mar. 27, 2013; pp. 1-8.
Office Action in U.S. Appl. No. 14/064,609; dated Sep. 4, 2015; pp. 1-7.
Office Action in U.S. Appl. No. 14/064,609; dated Feb. 12, 2016; pp. 1-8.

* cited by examiner

SECURE CONNECTED DIGITAL MEDIA PLATFORM

I. FIELD OF THE INVENTION

The present invention is in the field of systems, methods, and computer program products for a secure connected digital media platform.

II. BACKGROUND OF THE INVENTION

Television is moving from a pure broadcast approach to a two-way interactive approach. More television units and related devices (e.g., high-definition DVD players, video game consoles, set-top boxes) are being manufactured that are capable of connecting to the Internet through broadband connections. This dramatically expands the function, the type, and the amount of content that can potentially become available to consumers.

III. SUMMARY OF THE INVENTION

An embodiment of the invention provides a system including a secure media device having one or more security keys stored therein. The secure media device is housed in a digital media device (also referred to herein as the "connected digital media device") that is connected to a display unit (e.g., television unit) and a network. In at least one embodiment, the digital media device is housed in the television unit. The secure media device is on a system-on-a-chip (SoC) and includes a hypervisor for creating one or more secure application environments.

The secure application environments are housed in the digital media device, wherein all secure application environments are operationally isolated from one another. The secure application environments receive and process information sent over the network only if the information includes a security code corresponding to the security key in the secure media device. The information includes multimedia content and/or computer program instructions for processing the multimedia content. The multimedia content includes an audio file, a visual file, an audio-visual file, a media player, a codec, an instant messaging program, a web page, a local single-player video game, and/or a networked multiplayer video game.

The security code is obtained from a clearinghouse when the information satisfies predetermined criteria. More specifically, the clearinghouse receives a copy of the security key from a manufacturer of the secure media device and creates the security code based on the security key. The clearinghouse is remotely located respective to the digital media device and the television unit. The entity providing the information is different from the entity operating the clearinghouse.

Each of the secure application environments is directly connected to one or more portals. In at least one embodiment, each secure application environment is connected to only one portal; thus, when a portal is connected to the television unit, the connected portal has exclusive access to the television unit.

At least one embodiment of the invention provides a system including a security key module and a security code module housed in a clearinghouse module. The security key module receives a copy of one or more security keys from the manufacturer of a secure media device. The secure media device is housed in a digital media device connected to a television unit and a network The security code module creates a security code based on the security key and provides the security code to information sent over the network when the information satisfies predetermined criteria. The information is received and processed by a secure application environment housed in the digital media device, only if the information includes the security code. Each secure application environment is directly connected to only one portal. The clearinghouse module is remotely located respective to the digital media device and the television unit. Moreover, the entity providing the information is different from the entity operating the clearinghouse module.

An embodiment of the invention provides a method including storing one or more security keys in a secure media device (an SOC) housed in a digital media device. The digital media device is connected to a television unit and a network. A copy of the security key is transmitted to a clearinghouse.

Information sent over the network is received and processed in a secure application environment housed in the digital media device, only if the information includes a security code. The security code corresponds to the security key and is obtained from the clearinghouse when the information satisfies predetermined criteria. The entity providing the information is different from the entity operating the clearinghouse.

The information from the secure application environment is displayed to a user via a display unit (e.g., the television unit). A connected portal is granted exclusive access to an active secure application environment. The information includes multimedia content and/or computer program instructions for processing the multimedia content. The multimedia content includes an audio file, a visual file, an audio-visual file, a media player, a codec, an instant messaging program, a web page, a local single-player video game, and/or a networked multiplayer video game.

IV. BRIEF DESCRIPTION OF THE DRAWINGS

The present invention is described with reference to the accompanying drawings. In the drawings, like reference numbers indicate identical or functionally similar elements.

V. DETAILED DESCRIPTION OF THE DRAWINGS

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention provides a hardware platform, including at least one integrated circuit (IC), that controls information that can be downloaded onto one or more secure application environments in a connected digital media device (also referred to herein as a "device"). More specifically, the secure application environments receive and process information for a service sent over the Internet (e.g., software to support the service on the media device, as well as content, such as movies, songs, video games, photographs, animation, text, graphics, and/or web pages). Security keys are stored in the hardware platform, and the hardware has an associated method, such that information can only be downloaded onto a secure application environment if the information contains a security code corresponding to one of the security keys. A third party clearinghouse obtains the security keys from the manufacturer of the IC and provides the security codes corresponding to the security keys to the information providers.

At least one embodiment of the invention provides a system having a connected digital media platform (CDMP) for television-based entertainment that provides a connection to the Internet for consumption and interaction with all types of media. The CDMP creates a common approach for television manufacturers and the consumer electronics industry to connect to the Internet. The CDMP can also leverage the game development community innovating on the Power Performance Computing (PowerPC®) platform (available from International Business Machines, Armonk, N.Y., USA). In at least one embodiment, rapid expansion of the content available to end users is supported in a managed and reliable environment that enables a high quality consumer electronics experience.

Figure 1:
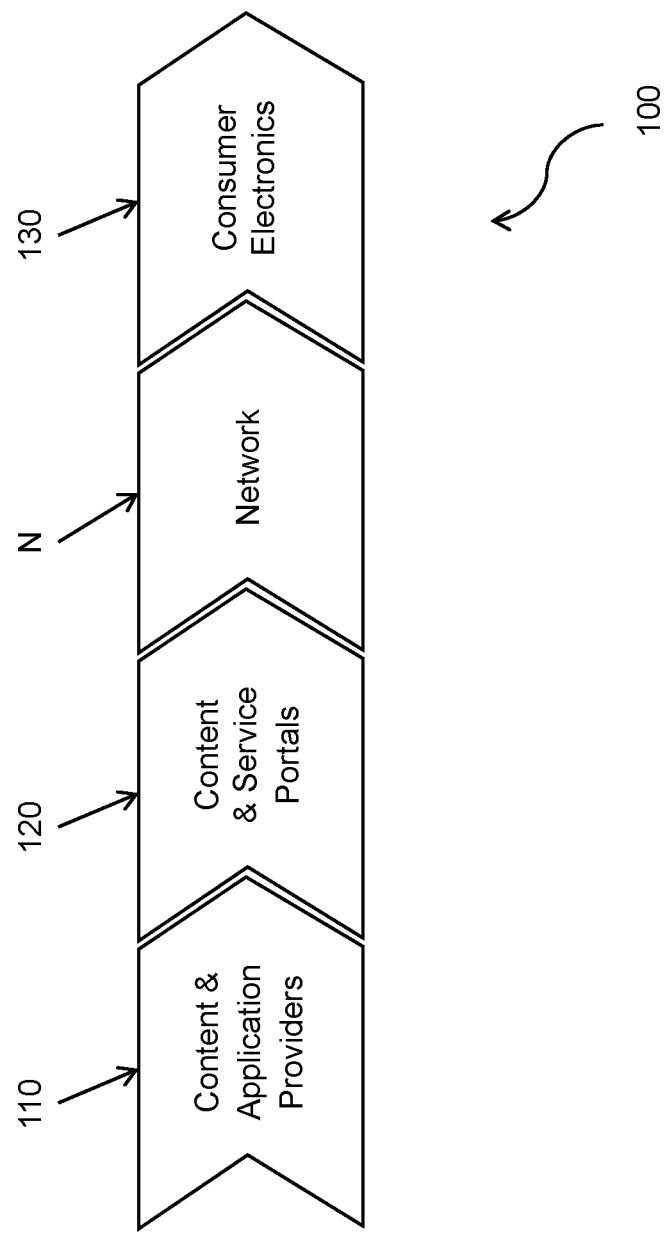
FIG. 1 illustrates value chain participants in an Internet TV ecosystem according to an embodiment of the invention.

FIG. 1 illustrates value chain participants 110-130 in an Internet TV ecosystem 100 according to an embodiment of the invention. The CDMP creates a secure environment for content providers and application providers 110 (e.g., video game designers and movie producers) into which they can confidently release high-value content without risk of piracy. At the same time, the security of the CDMP enables control of the software in the connected digital media device, which substantially reduces the risk that viruses and other malware may disrupt the users' entertainment experience. Hardware support for secure application environments makes this a secure CDMP. In at least one embodiment, the CDMP presents an open execution environment to application developers based on the Linux® operating system, with middleware support, and a rich set of development tools. The open software structure, together with a powerful general purpose processor, a graphics engine, and a video engine, provide the basis for innovation. The open execution environment enables the development of functions for the CDMP, while the hardware and secure system software assures the security of the software and the content.

The CDMP enables neutral access to consumers for content and service portals 120 (e.g., www.google.com and www.yahoo.com). The security of the environment allows the content and service portals 120 to protect their services from other services present on the system. For content and service portals 120, the CDMP provides a full-function, protected client environment for existing services, such as Internet video, and for new services, such as social applications and games. At the same time, the CDMP enables new business models for bringing services to consumers over broadband networks.

Consumer electronics manufacturers 130 are building devices that are connected to the content and service portals 120 via a network N. A secure environment is provided to create a managed and reliable consumer electronics experience, thereby avoiding personal computer (PC) problems such as viruses and other malware. At the same time, a rich base is provided on which the consumer electronics manufacturers 130 can differentiate their products, in both user interface and function. An embodiment of the invention builds a CDMP as the basis of an open and secure ecosystem for digital media on a media device, such as a television unit. The CDMP differs from a generic "open PC" platform by providing a stable and secure hardware target based on, for example, PowerPC®, advanced reduced instruction set computer machine (ARM®, www.arm.com), or microprocessor without interlocked pipeline stages (MIPS®, www.mips.com). The CDMP, in at least one embodiment, has additional programmable elements, such as a graphics processing unit (GPU), and functional elements implemented on the IC in discrete custom logic, such as support for video and audio compression and decompression (codecs), content encryption, and content decryption.

The CDMP also includes a secure application environment architecture based on hypervisor technology. A hypervisor, also known as a virtual machine monitor (VMM), is a computer software/hardware platform virtualization software that allows multiple operating systems to run on a host computer completely isolated from each other, which provides the basis for the secure application environments. Depending on the needs of the applications, the secure application environments can run concurrently with each other, or only one application environment can run at a time. Supported by hardware, the secure application environment architecture allows content portals to effectively have full control of the console when the user has "tuned" to that portal. This control includes the exclusive ability by the content portals to load software into the secure application environment in order to completely specify all aspects of the functionality, including the user interface and interactions, the branded appearance of the screen, and other functions (e.g., games). This architecture also allows users to effectively "tune" into Internet portals (i.e., websites) as they would tune into a standard television channel. When tuned into a portal, that portal has exclusive access to the full power of the system, i.e., the tuned-in portal is not a task competing with other tasks for resources.

The open architecture of the secure application environments in the CDMP allows direct access to the connected digital media device by any web content, of any media type that is supported on the system, without control by an intermediating portal. The open architecture also allows downloading of applications, such as games, codecs, and/or media players. However, in order to download these applications, a hardware code (also referred to herein as a "security code") must be obtained from a clearinghouse. In at least one embodiment, the clearinghouse is operated by a neutral third party that makes available hardware codes corresponding to hardware keys (also referred to herein as "security keys") in the CDMP to application and content providers based on a criteria of the application/content meeting certain consumer electronics friendly attributes (e.g., not a virus or satisfies a minimum criteria of consumer reliability and supportability). By providing a secure application environment, a channel-like architecture that is fully open, and a neutral third party transaction model for reliable loading of applications, software for running the applications, content, and/or software for processing the content into the secure application environments, the CDMP supports a variety of business models for all participants in the Internet television ecosystem. In addition, in at least one embodiment, the CDMP is based on PowerPC® technology, which leverages an ecosystem of developers in the content industry that currently supports a large share of software sales in the console gaming industry.

Figure 2:
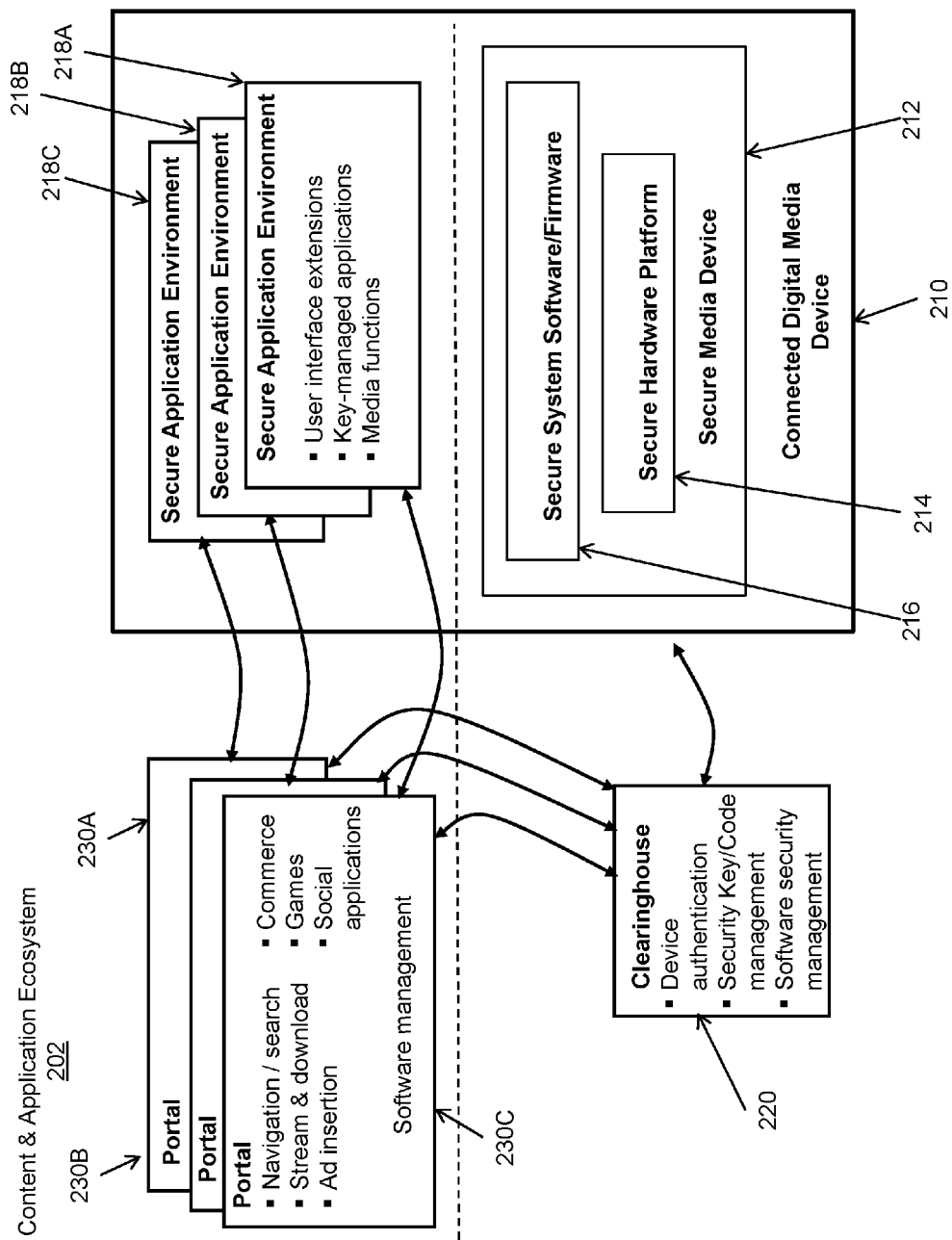
FIG. 2 illustrates a system according to an embodiment of the invention.

FIG. 2 illustrates a system having a connected digital media device 210, a clearinghouse 220, and portals 230 according to an embodiment of the invention. The portals 230 and a portion of the connected digital media device 210 are in a content and application ecosystem 202 (open Internet media environment). As described more fully below with reference to FIG. 3, the connected digital media device 210 includes a secure media device 212 having a secure hardware platform 214 and secure system software/firmware 216.

Together with hardware support for software security, the secure media device 212 creates secure application environments 218 for application software. Only software authenticated by a security code can be downloaded into the secure application environments 218, using unique hardware keys on the secure media device 212. As illustrated in FIG. 2, the secure application environments (i.e., 218A, 218B, and 218C) are completely isolated from each other. That is, the secure application environments 218 provide a "fenced off", secure execution environment for multimedia content and applications from portals.

The clearinghouse (also referred to herein as the clearinghouse module) 220 initially "owns" the hardware keys, which they sell to chip manufacturers. In another embodiment, the hardware keys are built into a chip in the connected digital media device 210 when the chip is manufactured, wherein the chip manufacturer sends a copy or information regarding the hardware keys to the clearinghouse 220. Using these keys, the clearinghouse 220 controls the creation of new secure application environments 218, and the secure downloading of software therein, which facilitates the addition of applications to the connected digital media device 210 or to enhance the user interface. In an alternative embodiment, the secure application environments 218 are pre-partitioned before the software is downloaded. However, once the secure application environments 218 have been established, the clearinghouse 220 is not involved in other basic interactions between the secure application environments 218 and the portals 230. In particular, the secure application environments 218A, 218B, and 218C connect directly to the portals 230A, 230B, and 230C, respectively, for any content interactions. However, the clearinghouse 220 can provide additional services to the service portals 230 or the consumer, for instance, authentication of the device or the service provider. As the clearinghouse 220 controls the establishment of new services on the connected digital media device 210, by enabling the portals 230 to create new secure application environments 218, the clearinghouse 220 can be used to implement various business models. For instance, in at least one embodiment of the invention, a service provider subsidizes a connected digital media device 210 that is rented to a consumer, wherein the service provider can determine which portals 230 can establish a connection with a secure application environment 218 on the connected digital media device 210, and under what business conditions. In this embodiment, the service provider operates the clearinghouse 220.

Each of the portals 230 is assigned a secure application environment 218 to establish a service on the connected digital media device 210. In at least one embodiment, there are no restrictions on the software in the portals 230, and all capabilities of the connected digital media device 210 are available to the software in virtualized form. Thus, each of the portals 230 can implement its own consumer services, its own user interface, and any digital rights management (DRM) system that may be desired. In at least one embodiment, after the software has been loaded onto the secure application environment 218 using the security code obtained from the clearinghouse 220, no further interaction with the clearinghouse 220 is required. In at least one embodiment, the clearinghouse 220 includes a security key module and a security code module. The security key module receives a copy of the security key from the manufacturer of the secure media device; and, the security code module creates the security code based on the security key. The clearinghouse 220 can optionally provide secure device authentication for services that provide applications and/or content to the connected digital media device 210, as may be desirable for some transactions, such as financial transactions.

Figure 3:
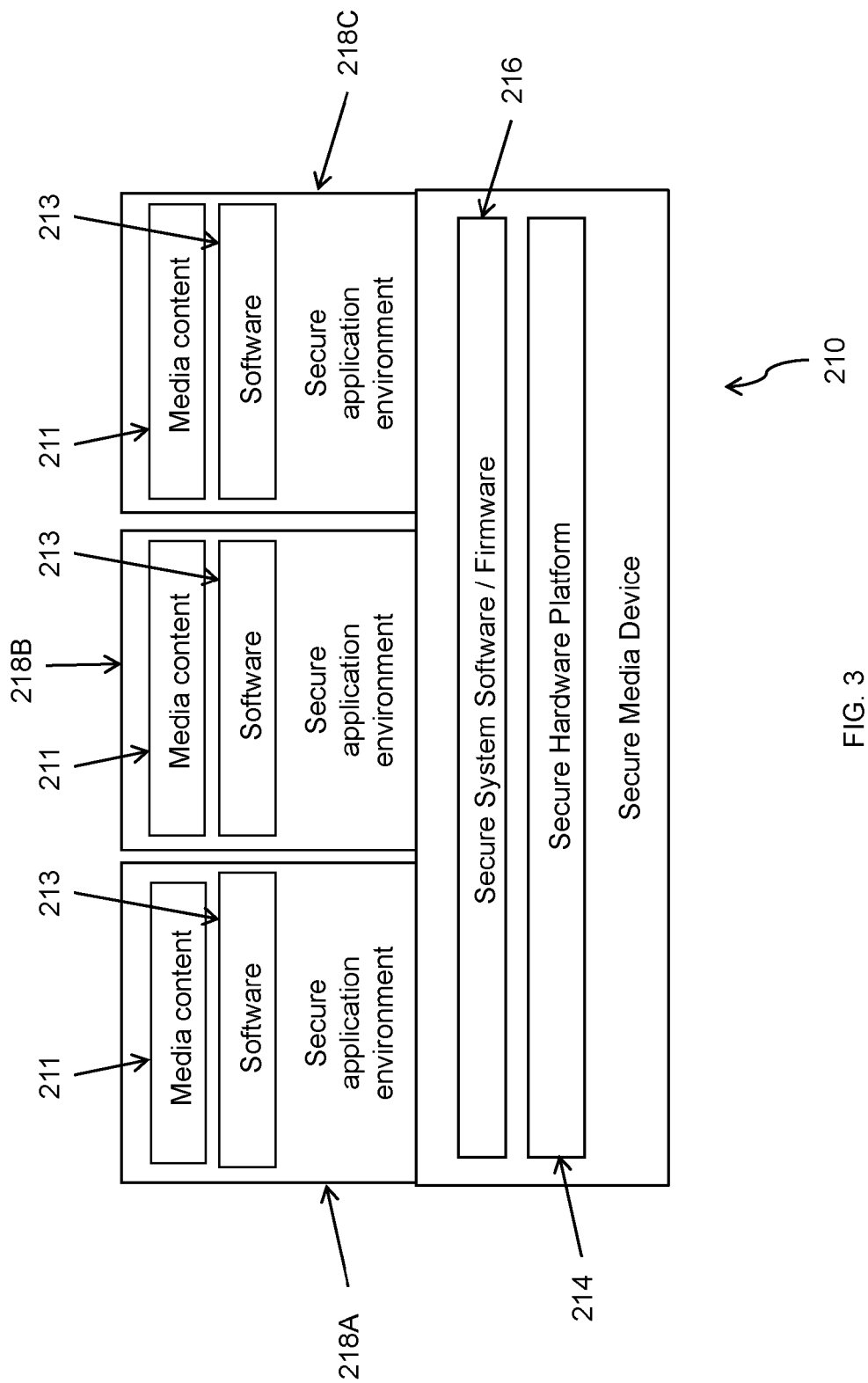
FIG. 3 illustrates a connected digital media device according to an embodiment of the invention.

FIG. 3 illustrates a connected digital media device 210 having a secure media device 212 and secure application environments 218 according to an embodiment of the invention. In the embodiment shown in FIG. 3, the secure media device 212 is built as a system-on-a-chip (e.g., digital media platform SoC) and includes a secure hardware platform 214 and secure system software/firmware 216. The secure hardware platform 214 includes a processor (e.g., PowerPC® processor), a graphics engine, a video/image processing engine, hardware encryption (i.e., for key management), the security keys and hardware support for codecs. The security of the secure application environments 218 are enforced by hardware features in the system-on-a-chip. The secure system software/firmware 216 includes a hypervisor and security management software.

The secure application environments 218A, 218B, and 218C each include media content 211 and software 213 for processing the media content 211. The media content 211 may include audio files, video files, image files, and/or video games. The software 213 may include user interface extensions, key-managed applications, media middleware such as media players, content browsers, and content management systems, DRM software, software supporting interactions with a remote control device, and an operating system (e.g. Linux®).

In one embodiment of the invention, the connected digital media device with its secure digital media device creates secure application environments. In this specific embodiment, however, the content of the secure application environment, that is, its software and its media content, secure with specific security codes, is not supplied over the network, but through a storage device, e.g. a USB storage device, that is connected to the unit housing the connected digital media device. This allows yet another business model, where a portal operator stores content on a storage device and makes that device available to users of the connected digital media platform. After loading the contents of the storage device into a secure application environment, that application environment may use the network connection to register itself with the clearinghouse and/or to obtain new content from a content portal 230.

The infrastructure of the system provides a highly flexible, powerful, and secure platform for a broad set of applications. This gives service providers and consumer electronics manufacturers freedom to innovate, and to differentiate products, services, and user experiences. In fact each secure application environment can have a full function operating system and application set, giving it effectively the same function and flexibility as a personal computer. In particular, the secure application environments 218 provide an opportunity for the portals 230 to establish distinctive and innovative user interfaces, by using standard web technologies such as asynchronous JavaScript and extensible markup language (AJAX) or Flash, or by downloading new native user interface software into a secure application environment 218. This facilitates the departure from a single, hardwired user interface for each connected digital media device 210, thereby enabling content portals, service providers, and aggregators to build distinct, branded user interfaces for their channels across all hardware devices supported by the connected digital media device 210.

In at least one embodiment of the invention, only one secure application environment 218 is assigned to a portal 230; and as such, the portal service and user interface may be developed completely independently from any other service or user interface. This represents a substantial departure from current set-top boxes and PCs, where new services must be integrated into the existing software stack, not only on the set-top box, but often also in the network.

The security features of the connected digital media device 210 enable a reliable and supportable consumer experience that supports a broad range of business models. They also support reliable DRM approaches inside the secure application environments 218, which can give content owners confidence to release their content to the connected digital media device 210.

Another embodiment of the invention provides a system having one or more general computer cores (GCCs) using multi-core technology, forming a connected digital media device, and associated security keys. As illustrated in FIGS. 2 and 3, the GCCs (also referred to herein as the "secure media device 212") are housed within the connected digital media device 210. The GCCs control a television unit that is either attached or detached to the system (i.e., integrated or by using a set-top box or similar device). The GCCs control the secure application environments, implementing TV functions such as selecting content to watch, changing channels, and interacting with the remote control, but also other advanced entertainment functions such as gaming or 3D virtual worlds.

The system can receive information through a network (e.g., Internet or LAN network), over the air broadcasting, cable, satellite, and/or Internet protocol television (IPTV).

The GCCs have instructions that use the security keys and the security codes to validate the authenticity of external information sent to the system. This external information is secured using knowledge based on the security keys. To reduce the risk of compromised security, the GCCs cannot read the security keys directly, and cannot make the security keys available to other components within the system. The GCCs also have instructions that allow it to load data to be processed and/or further instructions for the GCCs. This can be downloaded from RAM or other storage devices if authenticated using the security keys.

With appropriate hardware support, a hypervisor runs on the GCCs. The hypervisor creates secure application environments. As illustrated in FIGS. 2 and 3, the secure application environments 218A, 218B, and 218C are be completely isolated from each other in their operating modes. Each secure application environment is identified using the security codes and an identifier, such that only software authenticated for the secure application environment can be downloaded therein. The GCCs have security instructions which, using the security keys, facilitate the implementation of a DRM function in a secure application environment.

A secure application environment acts like a television channel, i.e., each secure application environment corresponds to a service in a network (e.g., the Internet). The service loads software into the secure application environment that is needed to receive content, to process it, to present it, and for consumers to interact with it. The service can be consumption of content, such as watching television or listening to music. The service can also provide means for communication, such as instant messaging or playing multiplayer games over the network connection.

In at least one embodiment, only one secure application environment has access to the resources of the system at any time, so that application developers for the secure application environment can optimize their applications for a given set of resources. In another embodiment, however, multiple secure application environments can be active at a time, depending on the application and on the hypervisor capabilities. For example, one secure application environment downloads content and another secure application environment presents the content. Through a scheme of priorities, the hypervisor ensures that the user's experience is not impacted.

In at least one embodiment of the invention, the GCCs are on a connected digital media device having local storage, such as a directly attached disk or a disk attached over the network. The storage includes information about the secure application environments, executable code for the secure application environments, user data, and/or media content. The hypervisor assures that each secure application environment in the connected digital media device only has access to its own storage, and not to the storage of any of the other secure application environments. In one embodiment, a common storage area is provided to which all secure application environments have access, wherein read access and write access is separated to assure security.

In at least one embodiment, a secure application environment communicates with other devices over a wired or wireless network connection. Thus, the secure application environment can share content or use the connected digital media device to control interaction with the other devices. For example, a secure application environment in a connected digital media device can control a screen in another connected digital media device. This is accomplished by establishing a secure network connection to the other digital media device, sending screen images to the other digital media device, and transmitting the user interaction transactions across the network.

When a user "changes the channel" by changing the secure application environment, the control device for the connected digital media device (e.g., remote control, game controller, or mobile phone) is automatically activated to control the newly active secure application environment. This is accomplished by connecting the interactive features of the remote control, such as buttons and pointers, to the corresponding software in the secure application environment Another embodiment of the invention provides a method to control the security features of the CDMP. More specifically, the CDMP is programmed onto a semiconductor chip (e.g., the secure media device 212) that has a unique set of security keys that initially only the manufacturer of the semiconductor chip knows. The manufacturer operates a clearinghouse, or transfers the information regarding the security keys to a third party that operates the clearinghouse. The semiconductor chip is in a connected digital media device that is connected to a network such as the Internet. As described above, a set of core software runs on the CDMP that enables it to communicate over the network, to establish secure application environments, control a hypervisor, and perform the security operations. For instance, the device is authenticated to a third party; and, a third party is authenticated to the device. Moreover, the method associates a secure application environment with a third party, and retrieves authenticated content from the secure application environment to the third party.

Yet another embodiment of the invention provides business models that can be implemented for a connected digital media device. A service provider (e.g., cable television service provider) subsidizes the purchase or rental of a connected digital media device that is connected to a television unit, wherein the service provider uses the clearinghouse to control access by other service providers to the end consumers. For example, a consumer requests content from a content provider (e.g., Netflix, www.netflix.com); and, the content provider requests a security code from the service provider. This creates a pure business relationship between the service and content providers. The content provider pays the service provider to obtain a security code; and, the content provider provides content directly to the consumer. This creates a walled garden where the "plots" can be rented out, and each of the plot tenants tends to its own plot. In at least one embodiment, the service provider or a third party offers additional services, such as software management, in the consumer's connected digital media device.

In another embodiment of the invention, a content and service portal subsidizes the connected digital media device to a consumer. In return for the subsidy, the consumer permits the content and service portal to place advertisements across all of the services received by the connected digital media device. The content and service portal also obtains information relating to consumer behavior across the services, e.g., frequently watched channels, frequently visited web sites.

Figure 4:
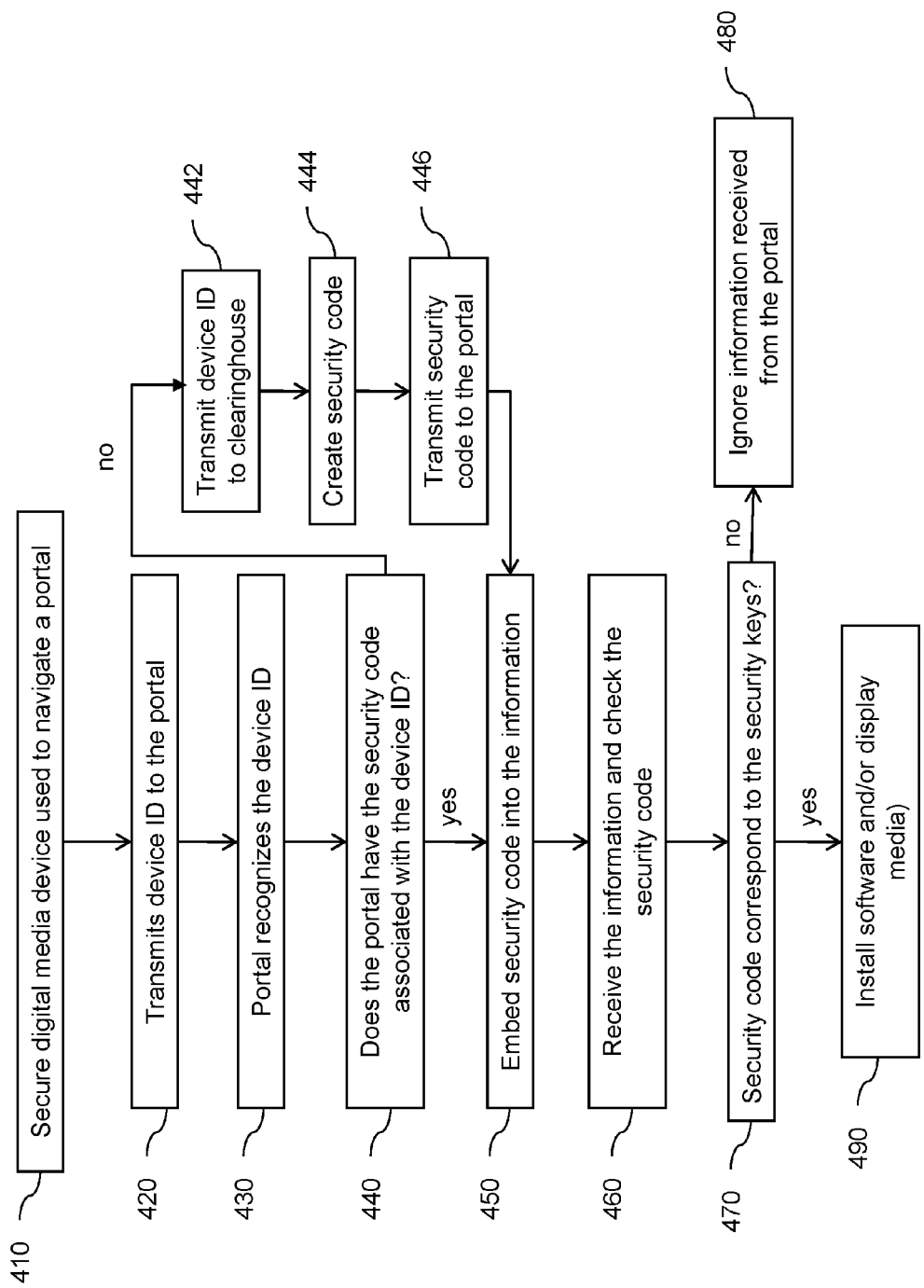
FIG. 4 is a flow diagram illustrating a method for a secure connected digital media platform according to an embodiment of the invention.

FIG. 4 is a flow diagram illustrating a method for a secure connected digital media platform according to an embodiment of the invention. More specifically, a user uses standard, built-in functions of the secure digital media device to navigate a network portal and request information from the network (410). As described above, the secure digital media device controls functions, such as selecting content to watch, changing channels, and interacting with the remote control. The system can receive information through a network (e.g., Internet or LAN network), over the air broadcasting, cable, satellite, and/or Internet protocol television (IPTV).

The secure digital media device transmits its device identification number to the network portal (420); and, the network portal recognizes the device identification number (430). As described above, each of the network portals is assigned a secure application environment to establish a service on the connected digital media device. In at least one embodiment, there are no restrictions on the software in the network portals, and all capabilities of the connected digital media device are available to the software in virtualized form. Thus, each of the network portals can implement its own consumer services, its own user interface, and any DRM system that may be desired. The network portal determines whether it has the security code associated with the device identification number (440).

If the network portal does not have the security code associated with the device identification number, the network portal transmits the device identification number to a clearinghouse (442). Based on the device identification number, the clearinghouse determines the security key associated with the device identification number and creates a security code associated with the security key (444). The clearinghouse transmits the security code to the network portal (446). In at least one embodiment, the clearinghouse is operated by a neutral third party that sells hardware codes corresponding to security keys in the CDMP to application and content providers based on a criteria of the application/content meeting certain consumer electronics friendly attributes (e.g., not a virus or satisfies a minimum criteria of consumer reliability and supportability).

If the network portal has the security code associated with the device identification number, or after the clearinghouse transmits the security code to the network portal, the network portal embeds the security code into the information (e.g., software, media objects) to be sent to the secure media device (450). The secure system software/firmware on the secure media device receives the information from the network portal and checks the security code (460).

The method determines whether the security code corresponds to the security keys embedded in the secure media device (470). If the security code does not correspond to the security keys, the secure media device ignores the information received from the network portal (480). If the security code corresponds to the security keys, the secure media device performs a function requested by the user (e.g., install software and/or display media objects) (490).

Figures 5A, 5B:
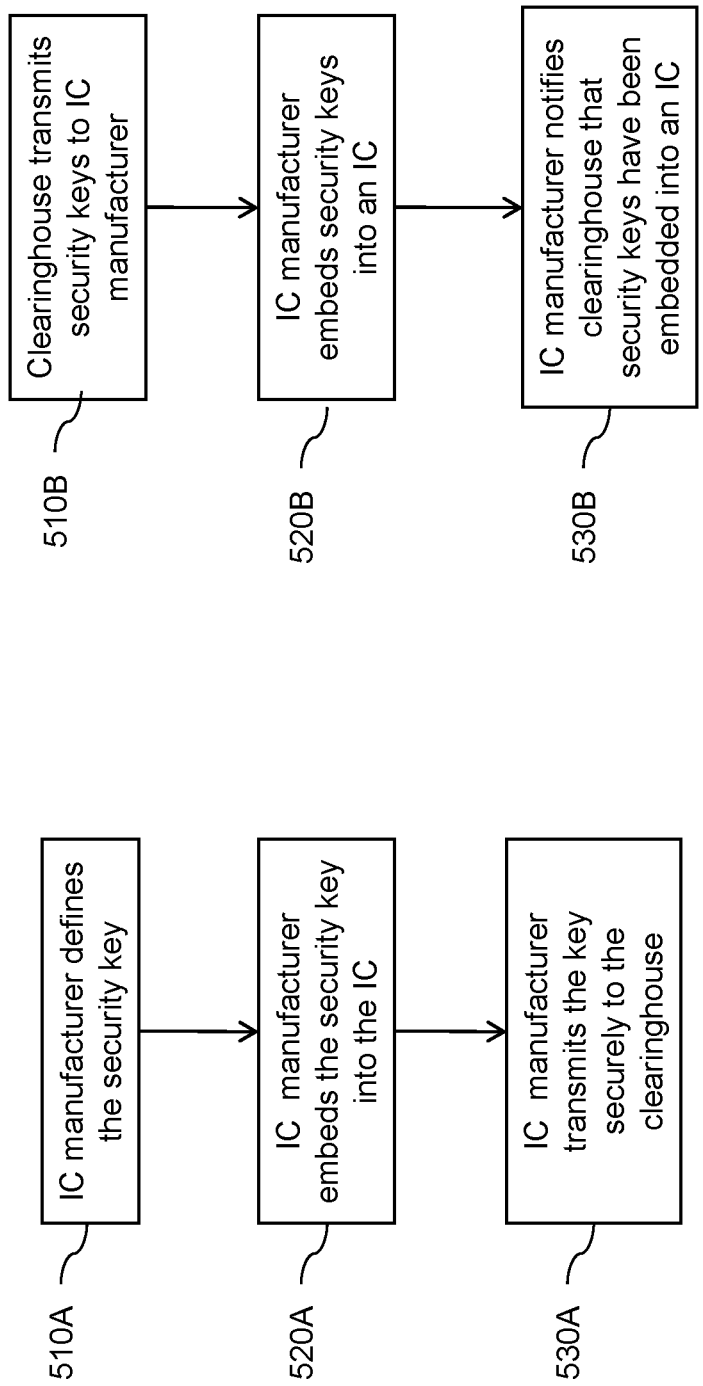
FIG. 5A is a flow diagram illustrating a method for security key management according to an embodiment of the invention.
FIG. 5B is a flow diagram illustrating a method for security key management according to another embodiment of the invention.

FIGS. 5A and 5B illustrate two alternatives for the coordination of the security keys between the IC manufacturer and the clearinghouse. In either case it may be economical that the IC manufacturer and the clearinghouse exchange the key information for batches of keys, rather than for individual keys. FIG. 5A is a flow diagram illustrating a method for security key management according to an embodiment of the invention, wherein the security key is determined by the IC manufacturer. More specifically, the IC manufacturer defines the security key (510A). The IC manufacturer embeds the security key into the IC (520A) and securely transmits the key to the clearinghouse (530A).

FIG. 5B is a flow diagram illustrating a method for security key management according to an embodiment of the invention, wherein the security key is determined by the clearinghouse. More specifically, the clearinghouse transmits sets of security keys to the IC manufacturer (510B). The IC manufacturer embeds one unique set of keys into an IC (520B). The IC manufacturer notifies the clearinghouse that a set of keys has been embedded into an IC (530B).

Figure 6:
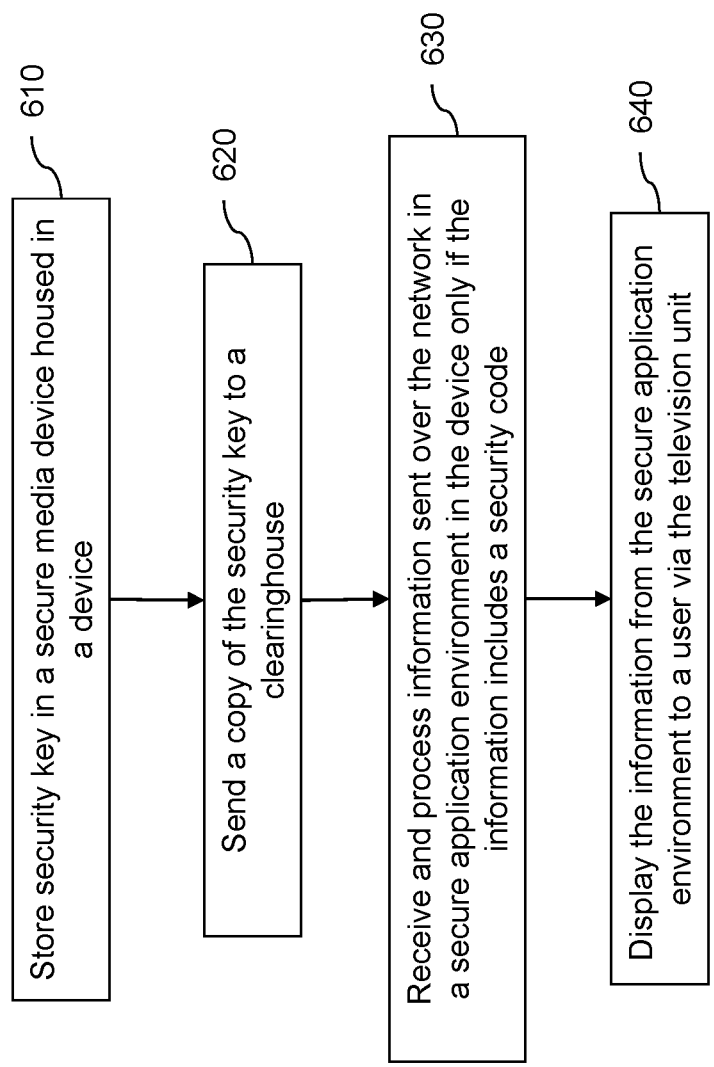
FIG. 6 is a flow diagram illustrating a method for a secure connected digital media platform according to an embodiment of the invention.

FIG. 6 is a flow diagram illustrating a method for a secure connected digital media platform according to an embodiment of the invention. More specifically, the method stores one or more security keys in a secure media device housed in a device (also referred to herein as the "connected digital media device") (610). The device is connected to a television unit and a network (e.g., the Internet).

A copy of the security key is sent to a clearinghouse (620). As described above, the clearinghouse includes a security key module and a security code module. The security key module receives a copy of the security key from the manufacturer of the secure media device; and, the security code module creates a security code based on the security key. In an alternative embodiment, the clearinghouse initially "owns" the security keys, which they sell to chip manufacturers. The security code corresponds to the security key stored in the secure media device. When information to be sent over the network satisfies predetermined criteria, the information receives the security code from the clearinghouse. The entity providing the information is different from the entity operating the clearinghouse.

Information sent over the network is received and processed in a secure application environment housed in the device, only if the information includes a security code (630). As described above, a secure application environment acts like a television channel, i.e., each secure application environment corresponds to a service in the network. The information from the service includes multimedia content and/or computer program instructions for processing the multimedia content. The multimedia content includes an audio file, a visual file, an audio-visual file, a media player, a codec, an instant messaging program, a web page, a local single-player video game, and/or a networked multiplayer video game.

The secure application environments connect directly to network portals for content interactions. As described above, in at least one embodiment, only one secure application environment has access to the resources of the system at any time, so that application developers for the secure application environment can optimize their applications for a given set of resources. In another embodiment, however, multiple secure application environments can be active at a time, depending on the application and on the hypervisor capabilities. For example, one secure application environment downloads content and another secure application environment presents the content. The information downloaded onto the secure application environment is displayed to a user via the television unit (640).

Figure 7:
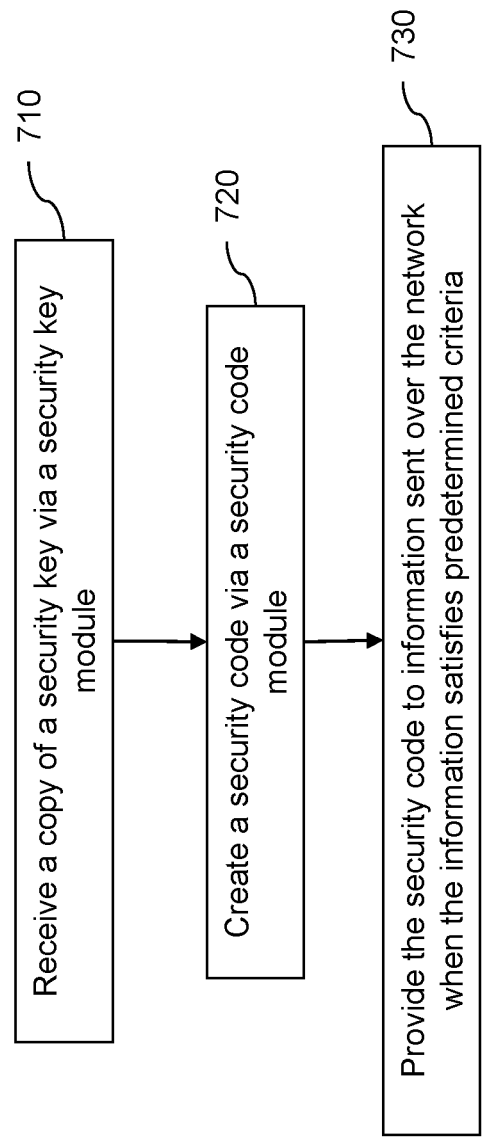
FIG. 7 is a flow diagram illustrating a method for a secure connected digital media platform according to another embodiment of the invention.

FIG. 7 is a flow diagram illustrating a method for a secure connected digital media platform according to another embodiment of the invention. More specifically, the method receives a copy of a security key via a security key module housed in a clearinghouse module (710). The security key is received from a manufacturer of the secure media device. The secure media device is housed in a device connected to a television unit and a network (e.g., the Internet).

A security code is created by a security code module housed in the clearinghouse module (720). The security code is created based on the security key and is provided to information sent over the network when the information satisfies predetermined criteria (730). The information includes multimedia content and/or computer program instructions for processing the multimedia content. The multimedia content includes an audio file, a visual file, an audio-visual file, a media player, a codec, an instant messaging program, a web page, a local single-player video game, and/or a networked multiplayer video game. The entity providing the information is different from the entity operating the clearinghouse.

The device includes one or more secure application environments, wherein each of the secure application environments is directly connected to only one network portal. The information is received and processed by a secure application environment in the device, only if the information includes the security code.

Figure 8:
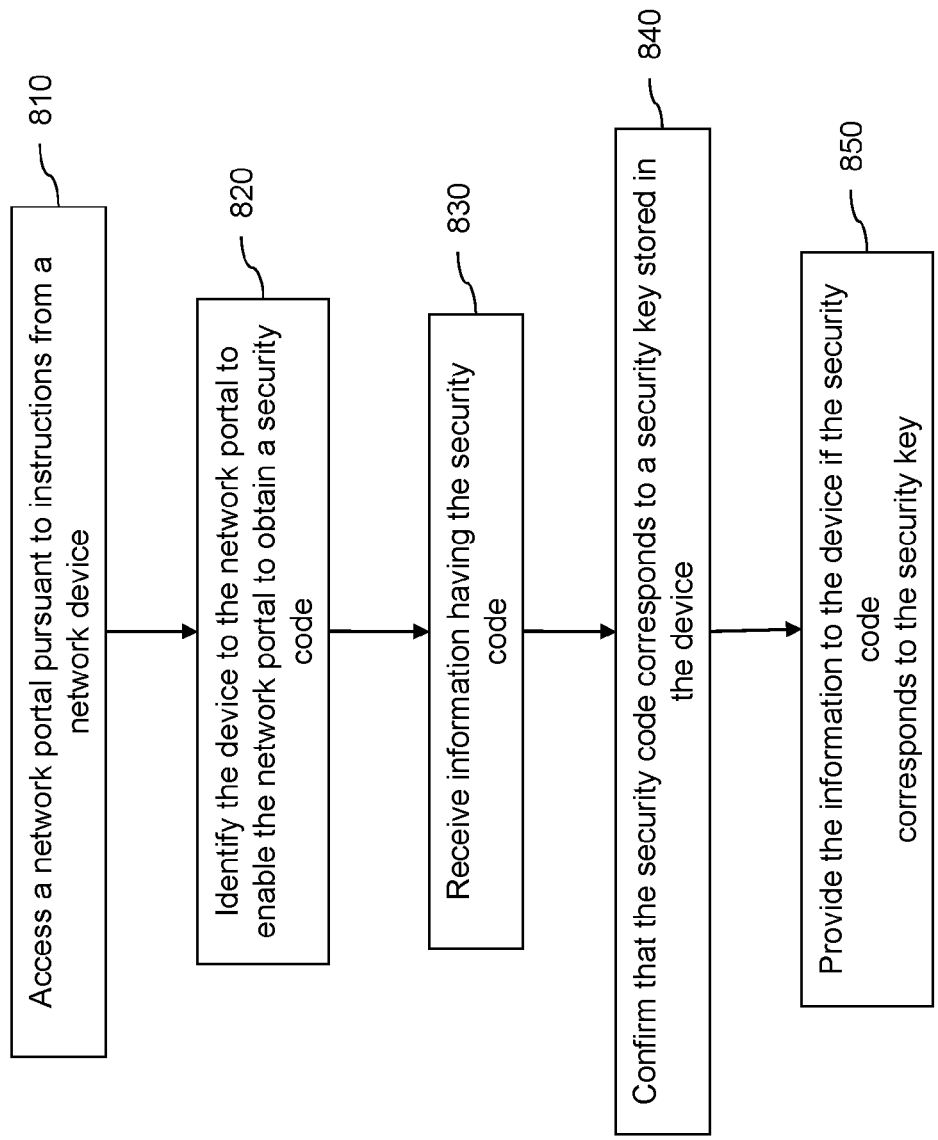
FIG. 8 is a flow diagram illustrating a method a for a secure connected digital media platform according to yet another embodiment of the invention.

FIG. 8 is a flow diagram illustrating a method for a secure connected digital media platform according to another embodiment of the invention. More specifically, the method accesses a network portal pursuant to instructions from a network device (810), wherein the network device is connected to a television unit and a network (e.g., the Internet). The network device includes one or more secure application environments and a secure media device having one or more security keys stored therein. The instructions from the network device include a request to download information onto a secure application environment.

The network portal identifies the network device to enable the portal to obtain a security code that corresponds to a security key stored on the secure media device (820). More specifically, a clearinghouse obtains a copy of the security key from the manufacturer of the secure media device, and creates the security code based on the security key. The clearinghouse sends the security code to a provider of information to be sent over the network when the information satisfied predetermined criteria.

The network device receives the information having the security code (830), and confirms that the security code corresponds to the security key stored in the secure media device (840). If the security code corresponds to the security key, the information is provided to the secure application environment (850).

At least one embodiment of the invention provides a method, wherein a request is received to create a secure partition (also referred to herein as a "secure application environment") for accessing a content provider in a digital media device. A security code is received from the content provider; and, a hypervisor is invoked at the digital media device. At least part of the hypervisor is comprised of a hardware circuit, e.g., SOC or chip.

The hypervisor compares the received security code with a key value (also referred to herein as a "security key") that is burned into a memory unit at the hardware circuit to determine if the security code is from an authorized content provider. If the content provider is determined to be authorized, a secure partition is created at the digital media device. This involves creating a memory partition that corresponds to the secure partition in a non-volatile memory at the digital media device, wherein the memory partition can only be accessed by the content provider having the security code. Additionally, the hypervisor receives software from the content provider and stores the software in the secure partition. The hypervisor also receives content from the content provider and stores the content in the secure partition.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
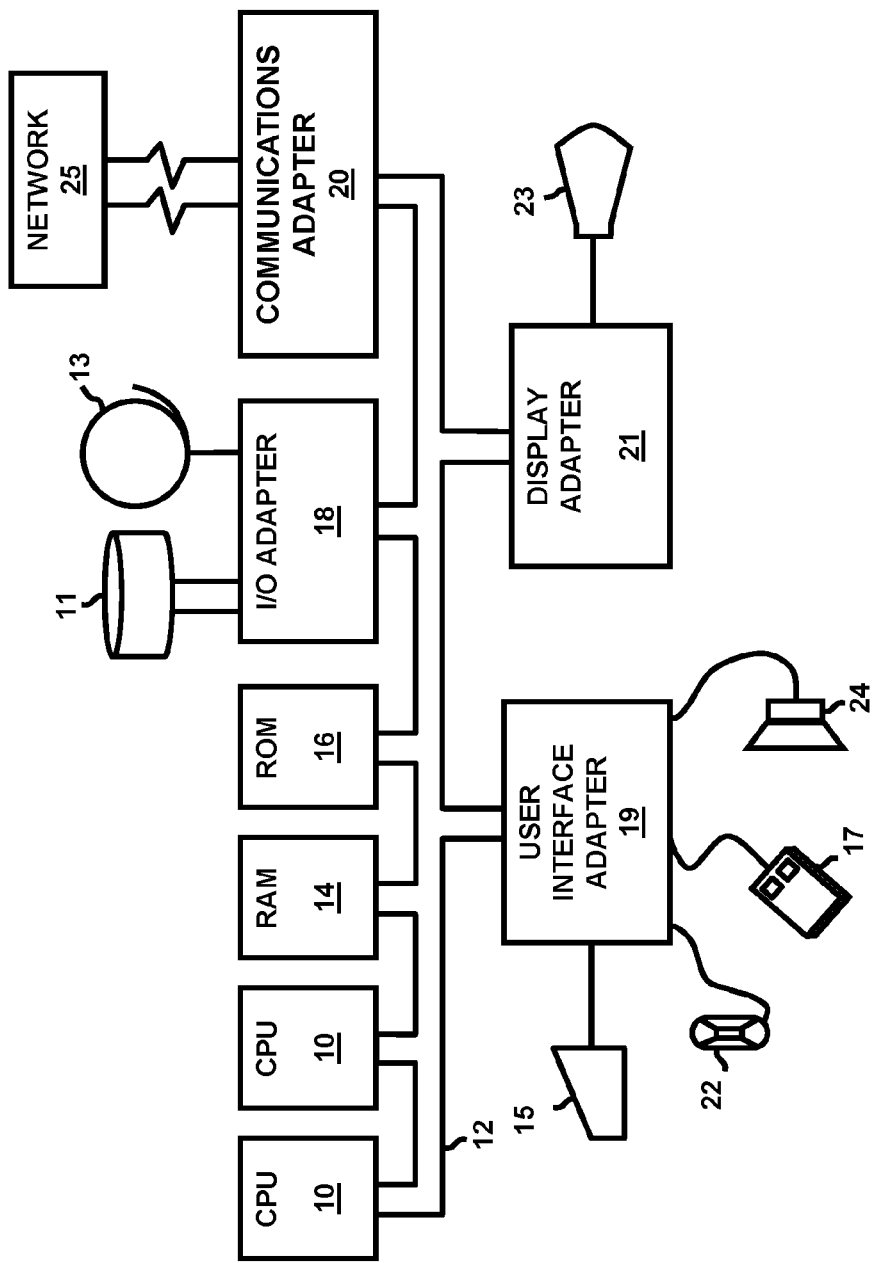
FIG. 9 illustrates a computer program product according to an embodiment of the invention.

Referring now to FIG. 9, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method, comprising:
    requesting by a digital media device information from a portal via a network, the digital media device being implemented on a system on a chip and having an embedded security key and one or more secure application environments therein;
    transmitting a device identification number from the digital media device to the portal, said portal being assigned to a secure application environment on the digital media device;
    transmitting the device identification number to a clearinghouse, said clearinghouse determining a security key associated with the device identification number and creating a security code associated with the security key;
    transmitting the security code from the clearinghouse to the portal, said portal embedding the security code into the requested information;
    sending the requested information with the embedded security code to the secure application environment, said secure application environment determining whether the embedded security code corresponds to the embedded security key; and
    performing a requested function using the information at the digital media device by the secure application environment when the security code embedded into the requested information corresponds to the embedded security key.

2. The method according to claim 1, wherein when the security code embedded into the requested information does not correspond to the embedded security key, the secure application environment ignores the requested information.

3. The method according to claim 1, wherein the clearinghouse receives a copy of the security key from a manufacturer of the digital media device.

4. The method according to claim 1, wherein an entity operating the clearinghouse is different from an entity providing the requested information.

5. The method according to claim 1, wherein the digital media device is connected to a display unit and the network is the internet.

6. The method according to claim 5, wherein the display unit comprises a television.

7. The method according to claim 1, wherein the embedded key is on an integrated circuit of the digital media device.

8. The method according to claim 1, wherein the digital media device comprises a plurality of secure application environments, each secure application environment being connected to only one portal.

9. The method according to claim 1, wherein the requested information comprises movies, songs, video games, photographs, animation, text, graphics, or web pages.

10. The method according to claim 1, further comprising displaying the requested information to a user via a television.

11. A computer program product for performing a method, the computer program product comprising:
    a non-transitory computer readable storage medium;
    first program instructions to request by a digital media device information from a portal via a network, the digital media device being implemented on a system on a chip and having an embedded security key and one or more secure application environments therein;
    second program instructions to transmit a device identification number from the digital media device to the portal, said portal being assigned to a secure application environment on the digital media device;
    third program instructions transmit the device identification number to a clearinghouse;
    fourth program instructions to receive a security code associated with the security key from the clearinghouse to the portal, said portal embedding the security code into the requested information;
    fifth program instructions to send the requested information with the embedded security code to the secure application environment; and
    sixth program instructions to determine whether the embedded security code corresponds to the security key embedded in the digital media device,
    wherein the first program instructions, the second program instructions, the third program instructions, the fourth program instructions, the fifth program instructions, and the sixth program instructions are stored on the non-transitory computer readable storage medium; and
    performing a requested function using the information at the digital media device by the secure application environment when the security code embedded into the requested information corresponds to the embedded security key.

12. The computer program product according to claim 11, wherein the digital media device is connected to a display unit and the network is the internet.

13. The computer program product according to claim 12, wherein the display unit comprises a television.

14. The computer program product according to claim 11, wherein the embedded key is on an integrated circuit of the digital media device.

* * * * *